(12) United States Patent
Naim et al.

(10) Patent No.: US 9,894,680 B1
(45) Date of Patent: Feb. 13, 2018

(54) SYSTEMS AND METHODS FOR ADJUSTING SUBFRAME TRANSMISSIONS BASED ON UPLINK DATA RATE

(71) Applicant: Sprint Spectrum LP, Overland Park, KS (US)

(72) Inventors: Muhammad Ahsan Naim, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 17 days.

(21) Appl. No.: 15/078,070

(22) Filed: Mar. 23, 2016

(51) Int. Cl.
*H04W 72/12* (2009.01)
*H04W 72/04* (2009.01)

(52) U.S. Cl.
CPC ..... *H04W 72/1268* (2013.01); *H04W 72/042* (2013.01); *H04W 72/0446* (2013.01)

(58) Field of Classification Search
CPC ........... H04W 72/1268; H04W 72/042; H04W 72/0446
See application file for complete search history.

(56) References Cited

U.S. PATENT DOCUMENTS

| 8,265,019 | B2 | 9/2012 | Madan et al. | |
|---|---|---|---|---|
| 2008/0151819 | A1* | 6/2008 | Bachl | H04W 52/146 370/329 |
| 2009/0010228 | A1* | 1/2009 | Wang | H04B 1/7105 370/335 |
| 2009/0161647 | A1* | 6/2009 | Mestechkin | H04B 1/707 370/342 |
| 2016/0007232 | A1* | 1/2016 | Wang | H04B 7/0456 370/280 |

FOREIGN PATENT DOCUMENTS

WO 2014/113941 A1 7/2014

* cited by examiner

*Primary Examiner* — Mohammad Anwar

(57) ABSTRACT

Systems and methods are described for adjusting subframe transmissions based on uplink data rate. Data may be communicated between an access node and a plurality of wireless devices, wherein the data is scheduled for communication according to a first subframe configuration with a first mix of uplink and downlink subframes. An uplink data rate for at least one of the plurality of wireless devices over a first portion of a period of time may be compared to an uplink criteria. A scheduling for a set of subframes over a second portion of the period of time may be adjusted based on the comparison such that the set of subframes comprises a second mix of subframes, wherein the second mix comprises a greater proportion of uplink subframes than the first mix. And data may be communicated between the access node and the plurality of wireless devices according to the adjusted scheduling for the set of subframes, wherein the uplink data rate for the at least one wireless device is increased over the second portion of the period of time.

18 Claims, 6 Drawing Sheets

SYSTEMS AND METHODS FOR ADJUSTING SUBFRAME TRANSMISSIONS BASED ON UPLINK DATA RATE

TECHNICAL BACKGROUND

Telecommunication systems, such as cellular networks or other wireless networks, provide access points such that wireless devices may access the systems. For example, an access node may comprise an access point used by a wireless device to gain access to a communication network. However, the access node may communicate with a number of wireless devices that comprise a number of different wireless channel conditions. For instance, a first wireless device may be located near the access node while a second wireless device may be located near a cell edge for the access node. It may be beneficial for a system to balance services provided to wireless devices in communication with an access node using adjustments to transmissions schedules such that the wireless devices are provided enhanced wireless services.

OVERVIEW

Systems and methods are described for adjusting subframe transmissions based on uplink data rate. Data may be communicated between an access node and a plurality of wireless devices, wherein the data is scheduled for communication according to a first subframe configuration with a first mix of uplink and downlink subframes. An uplink data rate for at least one of the plurality of wireless devices over a first portion of a period of time may be compared to an uplink criteria. A scheduling for a set of subframes over a second portion of the period of time may be adjusted based on the comparison such that the set of subframes comprises a second mix of subframes, wherein the second mix comprises a greater proportion of uplink subframes than the first mix. And data may be communicated between the access node and the plurality of wireless devices according to the adjusted scheduling for the set of subframes, wherein the uplink data rate for the at least one wireless device is increased over the second portion of the period of time.

DETAILED DESCRIPTION

Systems and methods are described for adjusting subframe transmissions based on uplink data rate. An access node and a plurality of wireless devices may communicate using a subframe configuration comprising a mix of uplink and downlink subframes. Uplink and downlink transmissions may be scheduled according to the subframe configuration. In an embodiment, at least one of the plurality of wireless devices may be located near a cell edge for the access node. Here, an uplink data rate for the at least one wireless device may be compared to an uplink data rate criteria.

Based on the comparison, it may be detected that the wireless device may not be able to maintain active communication with the access node while the access node continues to communicate using the first subframe configuration. Accordingly, a scheduling for a subset of subframes may be adjusted such that the adjusted subset comprises a mix of uplink subframes that is greater in proportion to the mix of uplink subframes in the first subframe configuration. The access node and plurality of wireless devices may then communicate according to the adjusted schedule, wherein the data rate for the at least one wireless device is increased based on the adjustment. Accordingly, the adjustment to the subframe scheduling may enable a wireless device on a cell edge of the access node to continue active communication with the access node.

Figure 1:
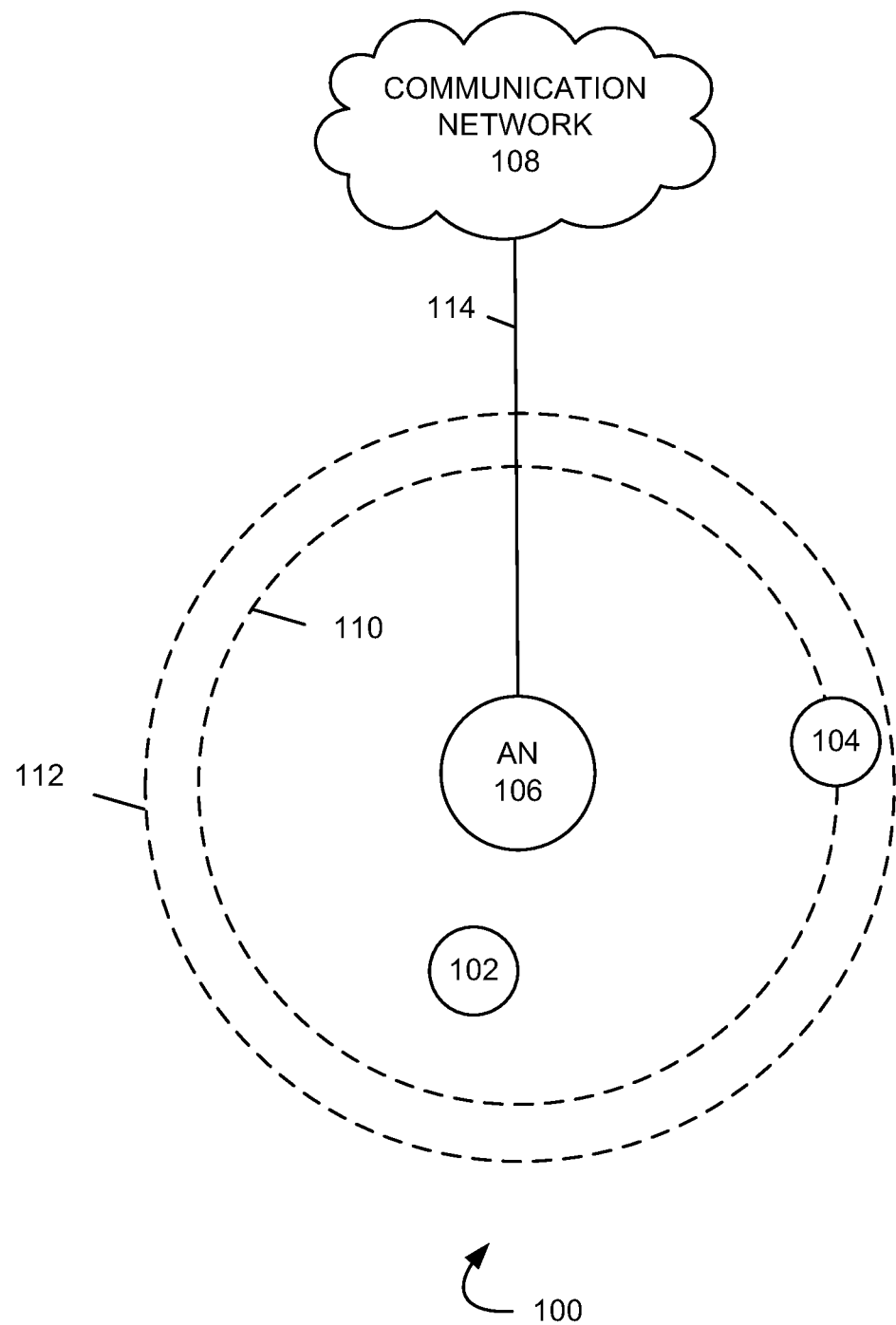
FIG. 1 illustrates an exemplary communication system to adjust subframe transmissions based on uplink data rate.

FIG. 1 illustrates an exemplary communication system 100 to adjust subframe transmissions based on uplink data rate comprising wireless devices 102 and 104, access node 106, communication network 108, coverage areas 110 and 112, and communication link 114. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 106 and communication network 108 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, relay communication device, or an internet access device, and combinations thereof. It is noted that while three wireless devices are illustrated in FIG. 1 as being in communication with the depicted access node and antenna system, any number of wireless devices can be implemented.

Access node 106 is a network node capable of providing wireless communication to wireless device 102, and can be, for example, a base transceiver station, a radio base station, an eNodeB device, a small cell (i.e. pico node, femto node, and the like), or any other suitable network element. Access node 106 may communicate with communication network 108 over communication link 114. Although only one access node is illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication link 114 can be a wired or wireless communication link. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 106 may establish communication with wireless devices 102 and 104 such that access node 106 provides the wireless devices access to a communication network (e.g., communication network 108). In an embodiment, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In some embodiments, the plurality of frequency bands used by system 100 may communicate based on a plurality of subframe configurations. For example, in a time division duplex (TDD) system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency at different times. A subframe configuration may comprise uplink subframes and/or downlink subframes, where each subframe configuration may comprise a different mix of subframes. Access node 106 may implement a subframe configuration such that uplink and downlink transmissions are scheduled according to the configuration.

In an embodiment, access node 106 may comprise coverage areas 110 and 112. For example, a coverage area may be the area around an access node or cell where a wireless device may detect wireless signals transmitted from the node or cell (e.g., detect signals at a signal level above a threshold) or where a wireless device may transmit wireless signals to the node or cell (e.g., transmit signals such that they are detected a the node or cell at a signal level above a threshold). In an embodiment, a communication protocol used by access node 106 to communicate with wireless devices may affect the effective coverage area for the access node. In an embodiment, coverages area 110 may comprise an effective coverage area for access node 106 when implementing a subframe configuration with a first mix of uplink and downlink subframes and coverages area 112 may comprise an effective coverage area for access node 106 when implementing a subframe configuration with a second mix of subframes. For example, the second mix of subframes may comprise a greater proportion of uplink subframes than the first mix of subframes, and thus coverage area 112 may be larger than coverage area 110.

In an embodiment, wireless devices 102 and 104 may comprise differing channel conditions when communicating with access node 106. For example, wireless device 102 may be proximate to access node 106 or in a center of a coverage area for access node 106 (e.g., one of coverage area 110 or 112, depending on the implemented communication protocol) while wireless device 104 may be at the edge of a coverage area for access node 106.

In an embodiment, access node 106 may implement a subframe configuration such that coverage area 110 is the effective coverage area for the access node. For instance, access node 106 may switch to a downlink conducive coverage area in order to meet application requirements for wireless devices communicating with the access node. Access node 106 may also implement the subframe configuration based on any other suitable conditions. However, wireless device 104 may not be able to maintain active communication with access node 106 when the access node implements this subframe configuration. Accordingly, adjusting the scheduling for the subset of subframes may enable a wireless device at the cell edge of a coverage area to maintain active communication with an access node while also maintaining a subframe configuration conducive to other conditions at the access node.

Figure 2:
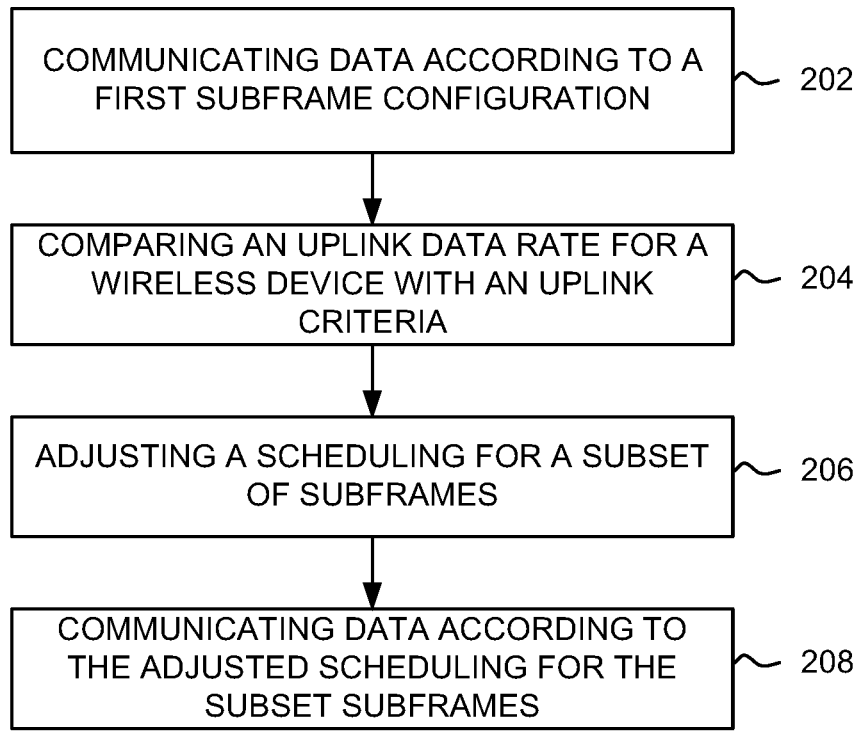
FIG. 2 illustrates an exemplary method for adjusting subframe transmissions based on uplink data rate.

FIG. 2 illustrates an exemplary method for adjusting subframe transmissions based on uplink data rate according to an embodiment. The method will be discussed with reference to the exemplary communication system 100 illustrated in FIG. 1, however, the method can be implemented with any suitable communication system.

Referring to FIG. 2, at step 202, data may be communicated between an access node and a plurality of wireless devices, wherein the data is scheduled for communication according to a first subframe configuration with a first mix of uplink and downlink subframes. For example, access node 106 may communicate with wireless devices 102 and 104 according to a first subframe configuration. The first subframe configuration may comprise a first mix of uplink and downlink subframes. In an embodiment, coverage area 110 may comprise the effective coverage area for access node 106 when implementing the first subframe configuration.

At step 204, an uplink data rate for at least one of the plurality of wireless devices over a first portion of a period of time may be compared to an uplink criteria. For example, wireless device 104 may be on the edge of coverage area 110. In an embodiment, an uplink data rate for wireless device 104 calculated over a first portion of a period of time may be compared to an uplink data rate criteria (e.g., threshold).

At step 206, a scheduling for a set of subframes over a second portion of the period of time may be adjusted based on the comparison such that the set of subframes comprises a second mix of subframes, wherein the second mix comprises a greater proportion of uplink subframes than the first mix. For example, based on the comparison between the uplink data rate for wireless device 104 and an uplink data rate criteria, it may be determined that a scheduling for a subset of subframes is to be adjusted.

In an embodiment, wireless device 104 may not be able to continue active communication with access node 106 if the first subframe configuration continues to be implemented by access node 106. Accordingly, scheduling for a subset of subframes may be adjusted such that the subset of subframes comprises a second mix of subframes, wherein the second mix may comprises a greater proportion of uplink subframes than the first mix of subframes.

At step 208, data may be communicated between the access node and the plurality of wireless devices according to the adjusted scheduling for the set of subframes, wherein the uplink data rate for the at least one wireless device is increased over the second portion of the period of time. For example, data may be communicated between access node 106 and wireless devices 102 and 104 according to the adjust scheduling over the second portion of the period of time. Because the subset of subframes comprises the second mix, and the second mix comprises a greater proportion of uplink subframes than the first mix, a coverage area for access node 106 may comprise coverage area 112 when the access node communicates according to the adjusted scheduling for the subset of subframes. Further, because the second mix comprises a greater proportion of uplink subframes than the first mix, an uplink data rate for wireless device 104 may increase over the second portion of the period of time (e.g., when compared to the date rate for wireless device 104 when access node 106 implements the first subframe configuration comprising the first mix of subframes).

Figure 3:
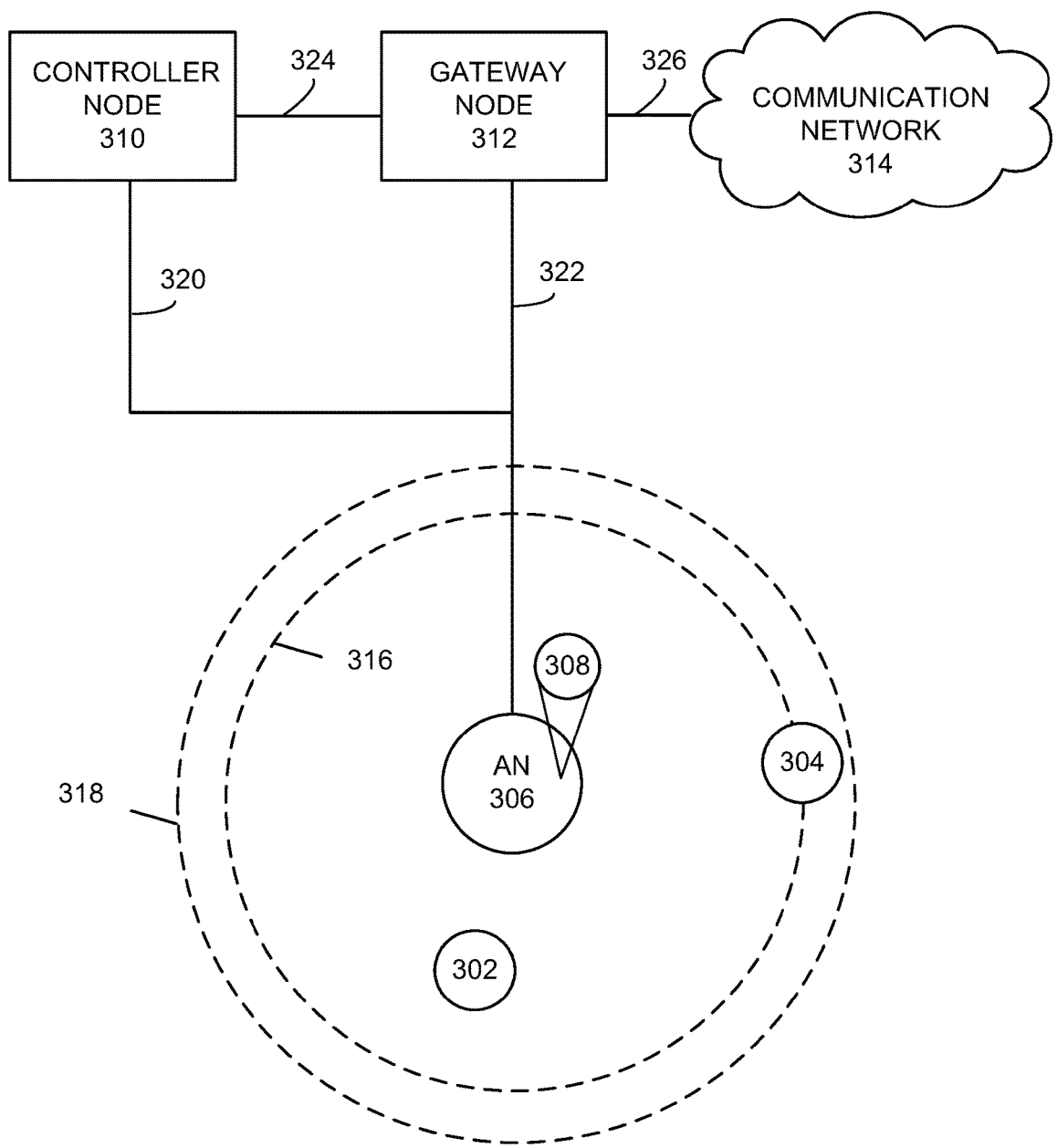
FIG. 3 illustrates another exemplary communication system to adjust subframe transmissions based on uplink data rate.

FIG. 3 illustrates another exemplary communication system 300 to adjust subframe transmissions based on uplink data rate according to an embodiment. Communication system 300 may comprise wireless devices 302 and 304, access node 306, scheduler 308, controller node 310, gateway node 312, communication network 314, coverage areas 316 and 318, and communication links 320, 322, 324, and 326. Other network elements may be present in the communication system 300 to facilitate communication but are omitted for clarity, such as base stations, base station controllers, gateways, mobile switching centers, dispatch application processors, and location registers such as a home location register or visitor location register.

Wireless devices 302 and 304 can be any device configured to communicate over communication system 300 using a wireless communication link. For example, wireless device 302 and 304 can include a cell phone, a smart phone, a computing platform such as a laptop, palmtop, or a tablet, a personal digital assistant, relay communication device, or an internet access device, and combinations thereof.

Access nodes 306 is a network node capable of providing wireless communication to wireless devices 302 and 304, and can be, for example, a base transceiver station, a radio base station, an eNodeB device, a small cell (i.e. pico node, femto node, and the like), or any other suitable network element. In an embodiment, access node 306 can comprise a serving access node for wireless device 302. Access node 306 may communicate with controller node 310 over communication link 320, and with gateway node 312 over communication links 322. Although only one access node is illustrated in FIG. 3, wireless devices 302 and 304 (and other wireless device not depicted) can be in communication with a plurality of access nodes and/or small cells. The plurality of access nodes and/or small cells can be associated with different networks and can support different communication protocols and radio access technologies.

Access node 306 may comprise scheduler 308 that schedules wireless transmissions for wireless devices 302 and 304. Scheduler 308 may comprise hardware and associated circuitry or software implementing computer code to perform scheduling functions. Scheduler 308 may be communicatively connected to one or more antennas of access node 306 such that the scheduler may configure the access not to transmit downlink signals and received uplink signals according to a schedule (e.g., subframe configuration).

Controller node 310 can be any network node configured to manage services within system 300. Controller node 310 may provide other control and management functions for system 300. The controller node 310 can be a single device having various functions or a plurality of devices having differing functions. For example, controller node 310 can include at least one of a multi-cell/multicast coordination entity (MCE), a mobility management entity (MME), a radio network controller (RNC), a mobile switching center (MSC), and a combination thereof.

Controller node 310 can comprise a processor and associated circuitry to execute or direct the execution of computer-readable instructions to obtain information. Controller node 310 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 310 can receive instructions and other input at a user interface. Controller node 310 can comprise a processor and associated circuitry to execute or direct the execution of computer-readable instructions to obtain information.

Gateway node 312 is a network element which can comprise a processor and associated circuitry to execute or direct the execution of computer-readable instructions. Gateway node 312 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 312 can provide instructions to access node 306 related to channel selection in communications with wireless devices. For example, gateway node 316 can comprise at least one of a serving gateway (SGW), a packet data network gateway (PDNGW), a cellular gateway (CGW), and a combination thereof.

Communication network 314 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 314 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 320, 322, 324, and 326 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 306, controller node 310, gateway node 312, and communication network 314 which are omitted for clarity, including additional processing nodes, routers, gateways, and physical and/or wireless data links for carrying data among the various network elements. In an embodiment, any of controller node 410, gateway node 312, and one or more modules of access node 306, may perform all or parts of the methods of FIGS. 2 and 4.

In operation, access node 306 may establish communication with wireless devices 302 and 304 such that access node 306 provides the wireless devices access to a communication network (e.g., communication network 314). In an embodiment, system 400 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In some embodiments, the plurality of frequency bands used by system 100 may communicate based on a plurality of subframe configurations. For example, in a time division duplex (TDD) system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency at different times. A subframe configuration may comprise uplink subframes and/or downlink subframes, where each subframe configuration may comprise a different mix of subframes. Access node 106 may implement a subframe configuration such that uplink and downlink transmissions are scheduled according to the configuration.

In an embodiment, access node 306 may comprise coverage areas 316 and 318. For example, a coverage area may be the area around an access node or cell where a wireless device may detect wireless signals transmitted from the node or cell (e.g., detect signals at a signal level above a threshold) or where a wireless device may transmit wireless signals to the node or cell (e.g., transmit signals such that they are detected a the node or cell at a signal level above a threshold). In an embodiment, a communication protocol used by access node 306 to communicate with wireless devices may affect the effective coverage area for the access node. In an embodiment, coverages area 316 may comprise an effective coverage area for access node 306 when implementing a subframe configuration with a first mix of uplink and downlink subframes and coverages area 318 may comprise an effective coverage area for access node 306 when implementing a subframe configuration with a second mix of subframes. For example, the second mix of subframes may comprise a greater proportion of uplink subframes than the first mix of subframes, and thus coverage area 316 may be larger than coverage area 318.

In an embodiment, wireless devices 302 and 304 may comprise differing channel conditions when communicating with access node 306. For example, wireless device 302 may be proximate to access node 306 or in a center of a coverage area for access node 306 (e.g., one of coverage area 316 or 318, depending on the implemented communication protocol) while wireless device 304 may be at the edge of a coverage area for access node 306.

In an embodiment, access node 306 may implement a subframe configuration such that coverage area 316 is the effective coverage area for the access node. For instance, access node 306 may switch to a downlink conducive coverage area in order to meet application requirements for wireless devices communicating with the access node. Access node 306 may also implement the subframe configuration based on any other suitable conditions. However, wireless device 304 may not be able to maintain active communication with access node 306 when the access node implements this subframe configuration. Accordingly, adjusting the scheduling for the subset of subframes may enable a wireless device at the cell edge of a coverage area to maintain active communication with an access node while also maintaining a subframe configuration conducive to other conditions at the access node.

Figure 4:
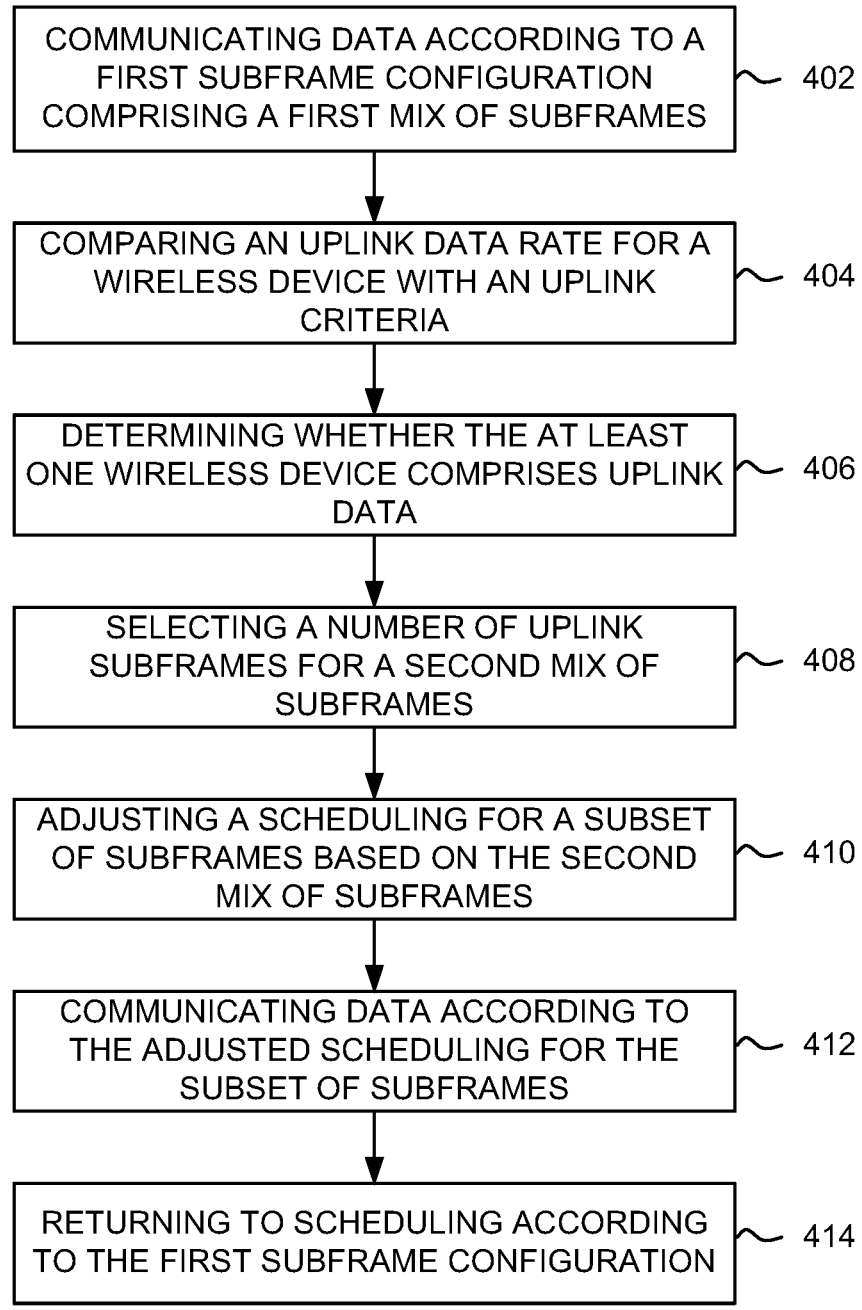
FIG. 4 illustrates another exemplary method adjusting subframe transmissions based on uplink data rate.

FIG. 4 illustrates an exemplary method for performing carrier aggregation for a wireless device proximate to an antenna system according to an embodiment. The method will be discussed with reference to the exemplary communication system 100 illustrated in FIG. 3, however, the method can be implemented with any suitable communication system.

Referring to FIG. 4, at step 402, data may be communicated between an access node and a plurality of wireless devices, wherein the data is scheduled for communication according to a first subframe configuration with a first mix of uplink and downlink subframes. For example, access node 306 may communicate with wireless devices 302 and 304 according to a first subframe configuration. The first subframe configuration may comprise a first mix of uplink and downlink subframes. In an embodiment, coverage area 316 may comprise the effective coverage area for access node 306 when implementing the first subframe configuration.

In an embodiment, wireless device 304 may comprise a non-guaranteed application requirement or otherwise communicates with access node 306 based on a non-guaranteed data bearer. For example, wireless device 304 may be serviced by an adjustment to scheduling for a subset of subframes, as detailed herein, because the wireless device comprises non-guaranteed application requirements.

Figure 5:
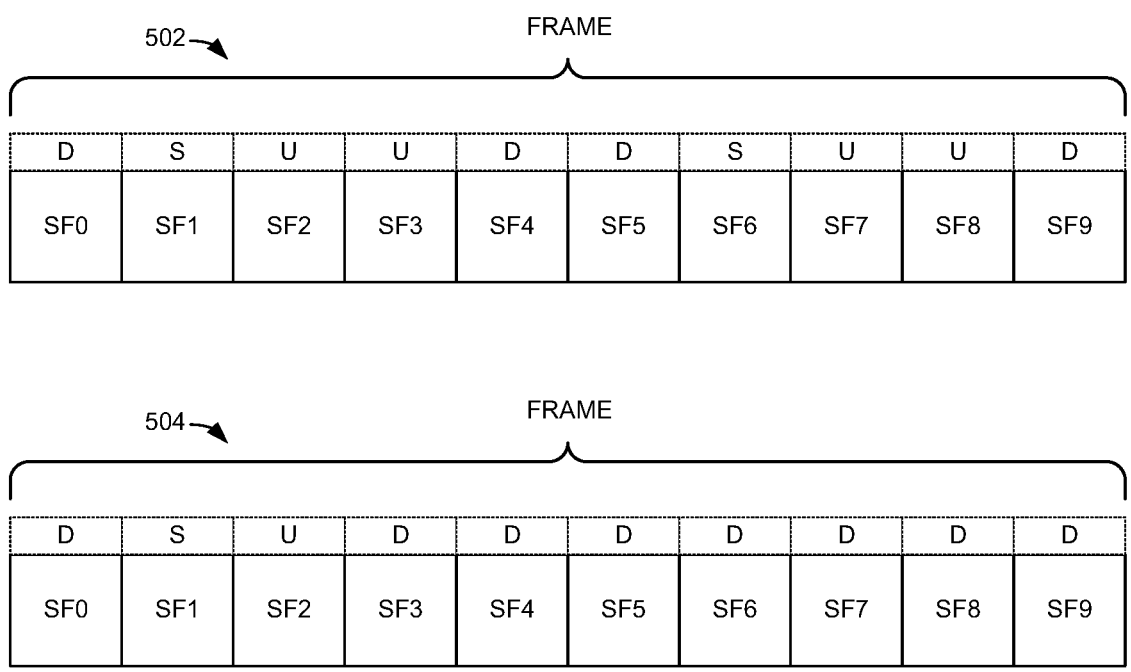
FIG. 5 illustrates exemplary subframe configurations for transmission scheduling in a time division duplex (TDD) protocol.

FIG. 5 illustrates sample subframes configurations in accordance with an embodiment. For example, a frame structure 502 may comprise 10 subframes, where the order of subframes may comprise downlink, special, uplink, uplink, downlink, downlink, special, uplink, uplink, and downlink. A frame structure 504 may comprise 10 subframes, where the order of subframes may comprise downlink, special, uplink, downlink, downlink, downlink, downlink, downlink, downlink, and downlink. Other frame structure may comprise various other mixes of special, downlink, and uplink configurations. In an embodiment, access node 306 may communicate with wireless devices 302 and 304 according to a first subframe configuration that is similar to the illustrated subframe configurations.

In some embodiments, the first subframe configuration may comprise a downlink conducive subframe configuration (e.g., a configuration with a threshold number of downlink subframes). For example, access node 306 may be in communication with a plurality of wireless devices, and one or more protocols may be triggered at the access node to improve services for these wireless devices. In an embodiment, application requirements for the wireless devices may trigger a switch to a downlink conducive subframe configuration such that access node 306 may better meet the application requirements. Other protocols, such as load balancing, scheduler configurations, and the like may also trigger a change to a downlink conducive subframe configuration. In an embodiment, coverage area 316 may comprise the effective coverage area for access node 306 when implementing the first subframe configuration based on the first subframe configuration being a downlink conducive subframe configuration (e.g., based on the threshold number of downlink subframes).

At step 404, an uplink data rate for at least one of the plurality of wireless devices over a first portion of a period of time may be compared to an uplink criteria. For example, wireless device 304 may be on the edge of coverage area 316. In an embodiment, an uplink data rate for wireless device 304 over a first portion of a period of time may be compared to an uplink data rate criteria (e.g., threshold). For example, based on channel conditions for wireless device 304 (e.g., a reported channel quality indicator), it may be determined that an uplink data rate for the wireless devices should be compared to the uplink data rate criteria.

In an embodiment, a minimum uplink data rate may be required for wireless device 304 to maintain active communication with access node 306. For example, where wireless device 304 comprises uplink data for transmission to access node 306, the minimum data rate may be required such that the wireless device may be able to communicate with communication network 314 via access node 306 according to a minimum level of service.

In an embodiment, the uplink data rate for wireless device 304 may be calculated over a first portion of a period of time. For example, the period of time may comprise a plurality of windows of time, each window comprising a plurality of transmission time intervals or subframes. For example, the period of time may comprise four windows of time and the uplink data rate for wireless device 304 may be determined over the first two windows for the period of time (e.g., the first portion of the period of time may comprise the first two windows).

In an embodiment, the uplink data rate criteria may comprise the minimum uplink data rate. For example, an uplink data rate for wireless device 304 may be compared to a minimum uplink data rate threshold. Accordingly, comparing the uplink data rate for wireless device 304 with the uplink data rate criteria may indicate that the uplink data rate for wireless device 304 over the first portion of the period of time is below a minimum to maintain active communication with access node 306.

In an embodiment, the uplink data rate for wireless device 304 may comprise a predicted uplink data rate according to the first subframe configuration. For example, based on a number of uplink subframes within a portion of the first subframe configuration, an uplink data rate may be predicted for wireless device 304 based on the conditions for the wireless device when scheduler 308 schedules communication according to the portion of the first subframe configuration. The portion of the first subframe configuration may comprise a number of subframes or correspond to a number of TTIs that comprises the first portion of the first window of time. The conditions for wireless device 304 may comprise a channel quality indicator (CQI) for the wireless device, or any other suitable conditions. For example, the conditions for wireless device 304 may be based on a signal level metric for a signal received from access node 306 (e.g., received signal to noise plus interference ratio (SINR), received signal strength indicator (RSSI), reference signal received quality (RSRQ), received signal received power (RSRP), and the like).

In an embodiment, the predicted uplink data rate may be compared to the uplink data rate criteria. For example, comparing the predicted uplink data rate for wireless device 304 with the uplink data rate criteria may indicate that the predicted uplink data rate for wireless device 304 over the first portion of the first period of time is below a minimum to maintain active communication with access node 306.

At step 406, it may be determined whether the at least one wireless devices comprises uplink data to be transmitted to access node 306. For example, a status for an uplink transmission buffer at wireless device 304 may be retrieved, and it may be determined whether wireless device 304 comprises uplink data to be transmitted access node 306.

In some embodiments, wireless device 304 may not comprise uplink data to be transmitted to access node 306, for instance if wireless device 304 is idle, or in any other suitable conditions. Accordingly, a scheduling for a subset of subframes may not be adjusted since wireless device 304 does not comprise uplink data that would prompt the adjustment in scheduling.

In an embodiment, an amount of uplink data to be transmitted from wireless device 304 to access node 306 may be compared to a criteria. For example, the uplink transmission buffer status of wireless device 304 may be compared to a buffer criteria. When the buffer status for wireless device 304 meets the criteria (e.g., when a threshold amount of data is buffered to be transmitted to access node 306) it may be determined that a scheduling adjustment to a subset of subframes, as further detailed herein, should be performed.

At step 408, a number of uplink subframes for a second mix of subframes may be selected. For example, it may be determined that scheduling for a subset of subframes is to be adjusted. In an embodiment, based on the adjustment, the subset of subframes may comprise a second mix of subframes, wherein the second mix comprises a greater proportion of uplink subframes than the first mix of subframes (e.g., the mix of subframes for the first subframe configuration). In an embodiment, the number of uplink subframes within (or a proportion of uplink subframes for) the second mix may be selected based on one or more of the uplink data rate for wireless device 304 over the first portion of the period of time, the comparison between the uplink data rate for wireless device 304 over the first portion of the period of time and the uplink data rate criteria, and any other suitable metrics.

In an embodiment, the subset of subframes for which scheduling will be adjusted may comprise the second portion of the period of time (e.g., TTIs or subframes that correspond to the second portion of the period of time). The second portion of the period of time may be equal to, larger than, or smaller than the first portion of the period of time. In an embodiment, the second portion of the period of time may directly follow the first portion of the period of time (e.g., a TTI that ends of the first portion of the period of time is immediately followed by a TTI that starts the second portion of the period of time).

In an embodiment, the number of uplink subframes within (or a proportion of uplink subframes for) the second mix may be selected based on the uplink data rate for wireless device 304 over the first portion of the period of time. For example, the number of uplink subframes (or proportion of uplink subframes) selected may be inversely proportional to the uplink data rate for wireless device 304 over the first portion of the period of time.

In an embodiment, the number of uplink subframes within (or a proportion of uplink subframes for) the second mix may be selected based on the comparison between the uplink data rate for wireless device 304 over the first portion of the period of time and the uplink data rate criteria. For example, the uplink data rate criteria may comprise a threshold uplink data rate that the wireless device should comprise to maintain active communication with access node 306. A difference between the uplink data rate for wireless device 304 and the threshold uplink data rate may be calculated.

In an embodiment, a compensation uplink data rate may be calculated, wherein the compensation uplink data rate would, when implemented over the second portion of the period of time, raise the average uplink data rate for wireless device 304 over the period of time to meet the threshold uplink data rate. For instance, given a threshold data rate R, a given length of the first portion of the period of time as two windows, and a given length of the second portion of the period of time as two windows, the date rate for wireless device 304 may fall below R over the first portion of the period of time (e.g., the first two windows). For instance, the date rate for wireless device 304 may be ½R for the first two windows of the period of time. In this instance, a number of uplink subframes (or a proportion of uplink subframes) may be selected for the subset of subframes where, over the second portion of the period of time, the compensation uplink data rate for wireless device 304 will average at least 2R. This may be illustrated as:

|  | 1st window | 2nd window | 3rd window | 4th window |
|---|---|---|---|---|
| Uplink data rate: | [1/2R] | [1/2R] | [2R] | [2R] |

Thus, the average uplink data rate for wireless device 304 over both the first portion of the period of time and the second portion of the period of time may comprise (½R+½R+2R+2R)/4=R. In this example, the compensation data rate over the second portion of the period of time may also comprise R and 4R (for each respective window), or any other suitable configuration that would result in the average uplink data rate for wireless device 304 over the period of time being at least R. The uplink data rate over the first portion of the period of time may also comprise other values.

In other embodiments, the first portion of the period of time and second portion of the period of time may comprise other numbers of windows, and may comprise different numbers of windows. For example, the first portion of the period of time may comprise three windows while the second portion of the period of time may comprise one window. Here, the uplink data rate over the period of time may be illustrated as:

|  | 1st window | 2nd window | 3rd window | 4th window |
|---|---|---|---|---|
| Uplink data rate: | [R] | [1/2R] | [1/2R] | [4R] |
| OR |  |  |  |  |
| Uplink data rate: | [R] | [R] | [1/2R] | [2R] |

Other suitable conditions and values may also be implemented where the average upload data rate for wireless device 304 over the period of time is at least R. In an embodiment, the number of uplink subframes within (or a proportion of uplink subframes for) the second mix may be selected based on the calculated compensation uplink data rate. For example, a first number (or proportion) of uplink subframes may be selected, where, for a given CQI for wireless device 304, it may be estimated that wireless device 304 will achieve at least the compensation uplink data rate when access node 306 communicates according to the subset of subframes over the second portion of the period of time.

This estimate may be based on a difference between the number of uplink subframes over the first portion of the period of time and the selected number of uplink subframes over the second portion of the period of time. For example, where a given window of the first portion of the period of time comprises X number of uplink subframes, and wireless device 304 achieves an uplink data rate of ½R over the given window of time, it may be estimated that over a given window of time for the second portion of the period of time, the wireless device will achieve a data rate of 2R when the number of uplink subframes selected for the window comprises 2X. Accordingly, a number of uplink subframes may be selected for the second mix.

At step 410, a scheduling for a set of subframes over a second portion of the period of time may be adjusted based on the comparison such that the set of subframes comprises a second mix of subframes, wherein the second mix comprises a greater proportion of uplink subframes than the first mix. For example, based on the comparison between the uplink data rate for wireless device 304 and an uplink data rate criteria, scheduler 308 may adjust a scheduling for a subset of subframes.

In an embodiment, the subset of subframes may comprise the second portion of the period of time. For example, the plurality of windows that comprise the second portion of the period of time may correspond to the subset of subframes (e.g., correspond to the TTIs for the subset of subframes). As detailed herein, a number of uplink subframes may be selected for the second mix of subframes. The scheduling for the subset of subframes may be adjusted based on the selected number of uplink subframes for the second mix of subframes.

In an embodiment, scheduler 308 may adjust the scheduling of the subset of subframes (e.g., second portion of the period of time) such that the uplink data rate for wireless device 304 over the period of time meets the uplink data rate criteria. For example, the scheduling of the subset of subframes may be adjusted such that wireless device 304 achieves a compensation uplink data rate, as calculated herein, while the communicating with access node 306 according to subset of subframes.

At step 412, data may be communicated between the access node and the plurality of wireless devices according to the adjusted scheduling for the set of subframes, wherein the uplink data rate for the at least one wireless device is increased over the second portion of the period of time. For example, data may be communicated between access node 306 and wireless devices 302 and 304 according to the adjusted scheduling over the second portion of the period of time. Because the subset of subframes comprises the second mix, and the second mix comprises a greater number (or proportion) of uplink subframes than the first mix, a coverage area for access node 306 may comprise coverage area 318 when the access node communicates according to the adjusted scheduling for the subset of subframes. Further, because the second mix comprises a greater number (or proportion) of uplink subframes than the first mix, an uplink data rate for wireless device 304 may increase over the second portion of the period of time.

In an embodiment, when communicating data according to the adjusted scheduling for the subset of subframes (e.g., over the second portion of the period of time), wireless device 304 may achieve an increased data rate such that the average data rate for the wireless device over the period of time meets the uplink data rate criteria. For example, when communicating data according to the adjusted scheduling for the subset of subframes, wireless device 304 may achieve a compensation uplink data rate, as calculated herein, such that the compensation uplink data rate averaged with the data rate for wireless device 304 over the first portion of the period of time meets the uplink data rate criteria.

At step 412, a scheduler may return, after transmission of the subset of subframes, to scheduling according to the first subframe configuration, the first subframe configuration comprising the first mix of uplink and downlink subframes. For example, scheduler 308 may return to scheduling communications with wireless devices 302 and 304 according to the first subframe configuration. In an embodiment, scheduler 308 may return to scheduling according to the first subframe configuration after conclusion of the period of time. For instance, after transmission of the subset of subframe (e.g., the second portion of the period of time), scheduler 308 may return to implementing the first subframe configuration.

In an embodiment, over the period of time, an uplink rate for wireless device 304 that meets the uplink criteria may have been achieved based on the adjusted scheduling for the subset of subframes over the second portion of the period of time. After the period of time, scheduler 308 may return to the first subframe configuration, for instance, so that wireless devices communicating with access node 306 may benefit from the first mix of subframes. The first mix of subframes may comprise a higher number of downlink subframes than the second mix of subframes. Accordingly, returning to the first subframe configuration may result in a benefit to the wireless devices served by access node 306. For example, when access node 306 becomes congested, the additional downlink subframes may be able to better service the wireless devices. A number of other conditions for access node 306 may also result in a benefit to served wireless devices when scheduler 308 returns to a subframe configuration with a greater number of downlink subframes.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
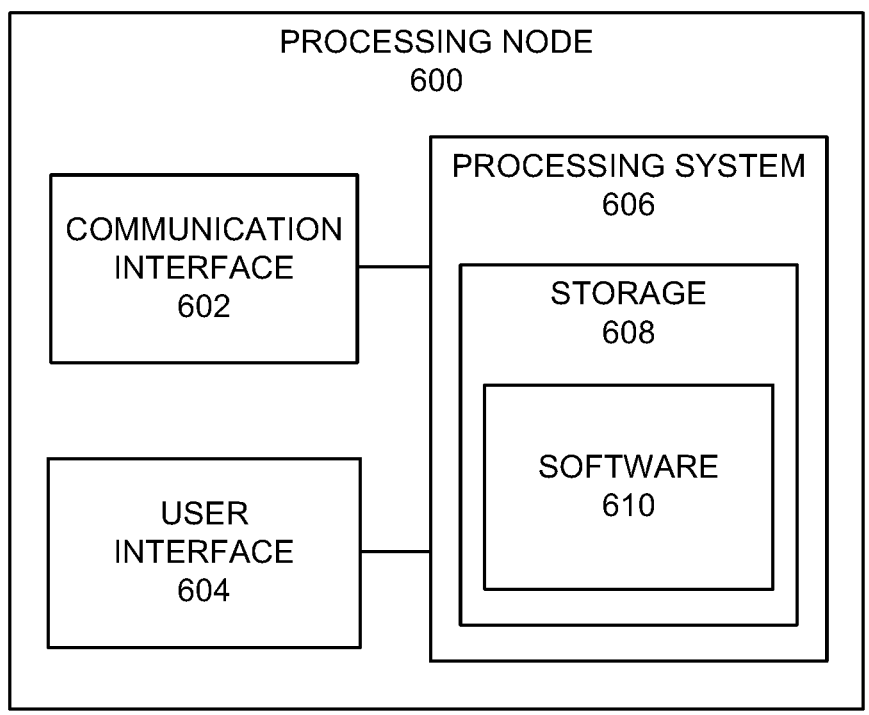
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 310 and gateway node 316. Processing node 600 can also be an adjunct or component of a network element, such as an element of access node 106, access node 306, and the like. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion.

The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. The method for adjusting subframe transmissions based on uplink data rate, the method comprising:
    communicating data between an access node and a plurality of wireless devices, wherein the data is scheduled for communication according to a first subframe configuration with a first mix of uplink and downlink subframes;
    comparing an uplink data rate for at least one of the plurality of wireless devices over a first portion of a period of time to an uplink criteria;
    selecting a number of uplink subframes for a second mix of uplink and downlink subframes based on the uplink data rate for the at least one wireless device over the first portion of the period of time, wherein the second mix comprises a greater proportion of uplink subframes than the first mix;
    adjusting a scheduling for a set of subframes over a second portion of the period of time based on the comparison such that the set of subframes comprises the second mix of subframes; and
    communicating data between the access node and the plurality of wireless devices according to the adjusted scheduling for the set of subframes, wherein the uplink data rate for the at least one wireless device is increased over the second portion of the period of time.

2. The method of claim 1, wherein the period of time comprises a plurality of time windows such that the first portion of the period of time comprises a first amount of time windows and the second portion of the period of time comprises a second amount of time windows.

3. The method of claim 2, wherein comparing the uplink data rate for the at least one wireless device with the uplink criteria indicates that the uplink data rate for the at least one wireless device over the first portion of the period of time is below a minimum to maintain active communication with the access node.

4. The method of claim 2, wherein communicating data between the access node and the plurality of wireless devices according to the adjusted scheduling for the subset of subframes increases the uplink data rate for the at least one wireless device over the second portion of the period of time.

5. The method of claim 1, further comprising selecting a number of uplink subframes for the second mix based on the comparison between the uplink data rate for the at least one wireless device and the uplink criteria, wherein the uplink criteria comprises an uplink data rate threshold and the selected number of uplink subframes is directly proportional to the difference between the uplink data rate for the at least one wireless device and the uplink data rate threshold.

6. The method of claim 1, wherein the number of uplink subframes for the second mix is selected such that the uplink data rate for the wireless device over the period of time meets the uplink criteria.

7. The method of claim 6, further comprising:
    calculating a compensation uplink data rate based on the data rate for the at least one wireless device over the first portion of the period of time such that an average data rate over the period of time meets the uplink criteria when the at least one wireless device comprises the compensation uplink data rate over the second portion of the period of time; and
    selecting a number of uplink subframes for the second mix based on the compensation uplink data rate.

8. The method of claim 1, further comprising:
    determining whether the at least one wireless device comprises uplink data to be transmitted to the access node; and
    adjusting the scheduling for the subset of subframes when it is determined that the at least one wireless device comprises uplink data to be transmitted to the access node.

9. The method of claim 1, further comprising returning, after transmission of the subset of subframes, to scheduling according to the first subframe configuration, the first subframe configuration comprising the first mix of uplink and downlink subframes.

10. The method of claim 1, wherein the at least one wireless device comprises non-guaranteed application requirements or a non-guaranteed data bearer when communicating with the access node.

11. A system for adjusting subframe transmissions based on uplink data rate, the system comprising:
    an access node comprising a scheduler and a processor configured to:
    communicate data between the access node and a plurality of wireless devices, wherein the data is scheduled for communication according to a first subframe configuration with a first mix of uplink and downlink subframes;
    compare an uplink data rate for at least one of the plurality of wireless devices over a first portion of a period of time to an uplink criteria;
    select a number of uplink subframes for a second mix of uplink and downlink subframes based on the uplink data rate for the at least one wireless device over the first portion of the period of time, wherein the second mix comprises a greater proportion of uplink subframes than the first mix;
    adjust a scheduling for a set of subframes over a second portion of the period of time based on the comparison such that the set of subframes comprises the second mix of subframes; and
    communicate data between the access node and the plurality of wireless devices according to the adjusted scheduling for the set of subframes, wherein the uplink data rate for the at least one wireless device is increased over the second portion of the period of time.

12. The system of claim 11, wherein the period of time comprises a plurality of time windows such that the first portion of the period of time comprises a first amount of time windows and the second portion of the period of time comprises a second amount of time windows.

13. The system of claim 12, wherein comparing the uplink data rate for the at least one wireless device with the uplink criteria indicates that the uplink data rate for the at least one wireless device over the first portion of the period of time is below a minimum to maintain active communication with the access node.

14. The system of claim 12, wherein communicating data between the access node and the plurality of wireless devices according to the adjusted scheduling for the subset of subframes increases the uplink data rate for the at least one wireless device over the second portion of the period of time.

15. The system of claim 11, wherein the access node is further configured to select a number of uplink subframes for the second mix based on the comparison between the uplink data rate for the at least one wireless device and the uplink criteria, wherein the uplink criteria comprises an uplink data rate threshold and the selected number of uplink subframes is directly proportional to the difference between the uplink data rate for the at least one wireless device and the uplink data rate threshold.

16. The system of claim 11, wherein the number of uplink subframes for the second mix is selected such that the uplink data rate for the wireless device over the period of time meets the uplink criteria.

17. The system of claim 16, wherein the access node is further configured to:
   calculate a compensation uplink data rate based on the data rate for the at least one wireless device over the first portion of the period of time such that an average data rate over the period of time meets the uplink criteria when the at least one wireless device comprises the compensation uplink data rate over the second portion of the period of time; and
   select a number of uplink subframes for the second mix based on the compensation uplink data rate.

18. The system of claim 11, wherein the access node is further configured to:
   determine whether the at least one wireless device comprises uplink data to be transmitted to the access node; and
   adjust the scheduling for the subset of subframes when it is determined that the at least one wireless device comprises uplink data to be transmitted to the access node.

* * * * *